Oct. 14, 1969 J. D. DAHL 3,472,336

STETHOSCOPE STRUCTURE

Filed June 10, 1968 2 Sheets-Sheet 1

INVENTOR.
JOSEPH D. DAHL

BY Reefoard Gregory

ATTORNEYS

INVENTOR.
JOSEPH D. DAHL

BY Reif and Gregory
ATTORNEYS

United States Patent Office 3,472,336
Patented Oct. 14, 1969

3,472,336
STETHOSCOPE STRUCTURE

Joseph D. Dahl, Minneapolis, Minn., assignor to Bio Data, Inc., Minneapolis, Minn., a corporation of Minnesota Filed June 10, 1968, Ser. No. 736,940
Int. Cl. A61b 7/02
U.S. Cl. 181—24 7 Claims

ABSTRACT OF THE DISCLOSURE

A stethoscope comprising a housing carrying a diaphragm and having ear tubes in connection therewith, said housing having a magnet therein attracting said diaphragm and a spring therein having a countereffect to said magnet with respect to said diaphragm. Said magnet and spring establish a closer correlation between the action of the diaphragm and the action of the chest wall against which it is held than can be attained with a conventional stethoscope and by means of which the full vibrational movement of the chest wall is transmitted by the diaphragm through the air column of said stethoscope.

Background and summary of the invention

A conventional stethoscope carries a diaphragm which normally is in a state of equilibrium with respect to the air pressure at either side thereof. When the stethoscope and the diaphragm carried thereby is placed against a chest wall, the diaphragm is pressed inwardly by the configuration of the chest wall and thus is moved to a position out of its state of equilibrium. The stethoscope is held against the chest wall with some degree of pressure and the diaphragm vibrates in response to the action of the chest wall. As the diaphragm is moved inwardly by the action of the chest wall, it has a natural tendency to resist this inward movement. As the chest wall recedes with each vibrational movement, the diaphragm tends to return in the direction of its state of equilibrium but never quite reaches this point for the reason above indicated. Thus the diaphragm does not have sufficient freedom of movement to have its vibrational movement correspond to the full extent of the vibrational movement of the chest wall. Hence, in effect, the diaphragm in a conventional stethoscope tends somewhat to dampen same to the air column of the stethoscope. The diaphragm does not of itself flex sufficiently to yield fully to and have its movement correspond with the full extent of the movement of the chest wall.

The invention herein generally described comprises a stethoscope having a housing having a chamber therein, a magnetically attractive diaphragm overlying the open side of said chamber, a magnet seated within said chamber positioned to have said diaphragm attracted thereto, a spring disposed within said chamber normally tending to engage and position said diaphragm somewhat outwardly of its state of equilibrium in inoperative position, said spring being under such tension with respect to the force of said magnet that when said diaphragm is placed against a chest wall under a slight degree of pressure, it is positioned in a state of equilibrium with the pressure of the spring equalizing the pressure of the diaphragm against the chest wall and the attraction of the magnet. With said diaphragm in a state of equilibrium, as the vibration of the chest wall moves the diaphragm inwardly of the direction of the magnet, the magnet tends to neutralize the innate tendency of the diaphragm to build up increasing resistance to a flexing movement whereby the inward movement of the diaphragm corresponds fully to the full extent of the inward movement of the chest wall.

The magnet has an attractive force which approximates the force which the diaphragm tends to resist flexing movement. The spring in being compressed by the inward movement of the diaphragm stores up energy which is released upon the return or outward movement of the chest wall with respect to the diaphragm and said spring causes said diaphragm to follow and substantially correspond with the full extent of such outward movement or contraction of the chest wall to a point beyond the state of equilibrium of the diaphragm. Thus the magnet and spring optimize the flexible movement of the diaphragm causing it to have the same extent of a cycle of vibration as that of the chest wall causing the diaphragm to have its movement correlated to and corresponding with the movement of the chest wall whereby said diaphragm transmits the full extent of the vibration of the chest wall to the air column of the stethoscope.

It is an object of this invention therefore to provide an improvement in the structure of a stethoscope wherein the diaphragm of the stethoscope is provided with a flexibility to permit its flexing movement to correspond to the full extent of the vibration of the chest wall against which it is placed.

It is another object of this invention to provide a stethoscope structure wherein the diaphragm is constructed and arranged to be operated from a state of equilibrium and to be substantially free from the effects of the natural tendency of the diaphragm to resist flexing.

It is a further object of this invention to provide a stethoscope structure wherein the movement of the diaphragm more nearly corresponds to the full movement of a chest wall against which it is placed than is achievable with a conventional stethoscope structure and whereby the full extent of the vibration of the chest wall is transmitted by the diaphragm to the air column of the stethoscope.

It is also an object of this invention to provide a stethoscope structure having a diaphragm and means in connection therewith to neutralize the innate resistance of the diaphragm with respect to flexing.

These and other objects and advantages of the invention will be set forth in the following description made in connection with the accompanying drawings in which like reference characters refer to similar parts throughout the several views and in which:

FIG. 8 is a view similar to FIG. 2 showing a modification thereof.

Description of a preferred embodiment

Figure 1:
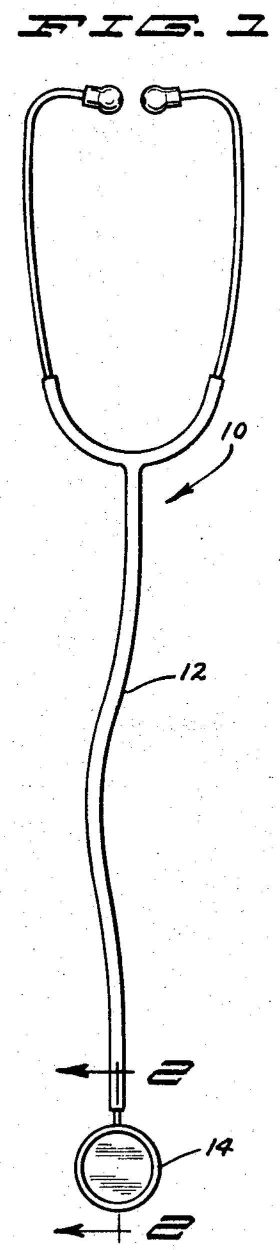
FIG. 1 is a plan view of the invention herein.

Referring to the drawings and more particularly to FIGS. 1–4, a stethoscope is indicated generally by the reference numeral 10. Said stethoscope is shown as a binaural type of instrument consisting of a conventional ear tube 12 and a chest piece 14 which comprises the subject matter of the invention herein.

Said chest piece 14 consists of a housing 15 indicated as being cylindrical in form and for purposes herein is formed of a non-magnetic material. Said housing has a side wall 17 having an upper threaded portion 18, a closed bottom wall 19 and an annular rim portion 20 forming an upper end or top wall.

Recessed axially within said housing is a chamber 22 shown being circular in cross section having an annular inner end recessed portion 23 about an upstanding base or seat portion 25. At the open side of said chamber is a shallow chamber 27 of greater diameter having its periphery defined by said upper end wall 20.

Said chambers 22 and 27 will form the air chamber within said housing.

Overlying said chambers 27 and 22 and having its rim portion seated on said upper end wall 20 is a flat diaphragm 30 which may be suitably formed of a thin plastic material chosen for suitable flexibility. Said diaphragm is suitably secured by an angular threaded ring 32 of a type commonly known as a bezel.

Centered on the inner side of said diaphragm is a thin magnetically attractive disc 34 secured to said diaphragm by a suitable adhesive. It will be understood that said diaphragm may be formed of a magnetically attractive material such as of thin sheet steel.

Seated on said upstanding base portion 25 is a permanent type magnet 37 shown to be cylindrical in form and being polarized to have its opposing poles at its upper end portion, as indicated by the characters N and S. Said magnet may be secured to said base 25 by an appropriate adhesive 38.

Figure 2:
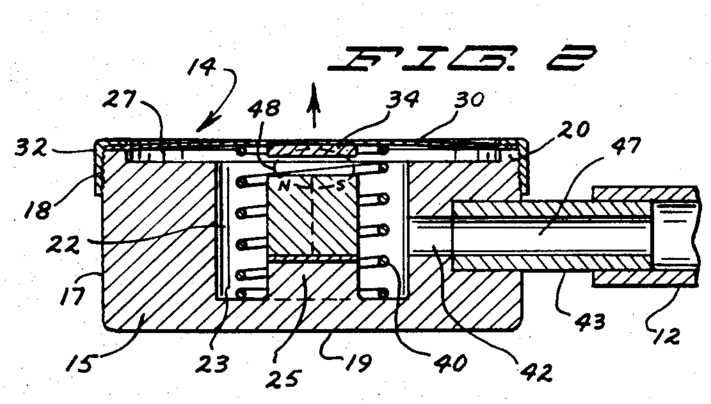
FIG. 2 is a vertical section of a broken view taken on line 2—2 of FIG. 1 as indicated.

Disposed about said magnet and extending upwardly of said chambers 22 and 27 is a circular compression spring 40 which will be rendered noiseless in movement by being coated in a conventional manner with a suitable rubber compound. Said spring will be in contact with and will be exerting force outwardly against said diaphragm. Said spring is carefully selected to have the force it exerts against said diaphragm in a determined relationship to the magnetic force of said magnet. Said spring normally will bear against said diaphragm with sufficient force to flex the same outwardly beyond a position in which it would be in a state of equilibrium balanced between the force of the spring and the force of said magnet. Said diaphragm is shown in FIG. 2 projecting outwardly beyond its position of being in a state of equilibrium, and in FIG. 3 it is shown positioned in a state of equilibrium.

Extending radially from said chamber 22 to the atmosphere through said housing 15 is an outlet 42 and has extending outwardly of an enlarged outer portion thereof a pressure fitted stub outlet fitting 43 to which is removably connected the ear tube 12. Extending through said outlet 42, fitting 43 and said tube 12 is a passage 47 which forms the air column of the stethoscope in connection with the chambers 22 and 27.

It will be noted that with the use of a non-magnetic housing a closed flux path 48 is generated between the poles of the magnet through the magnetically attractive disc carried by the diaphragm 30.

Operation

The stethoscope described herein may be used to have the same degree of body sound transmission as is experienced with a conventional stethoscope by applying the chest piece shown in FIG. 2 to the chest wall 49 of a person. The chest piece may be placed against the chest wall with a slight degree of pressure but not such a degree that the diaphragm is pushed inwardly to a position of equilibrium.

Figure 3:
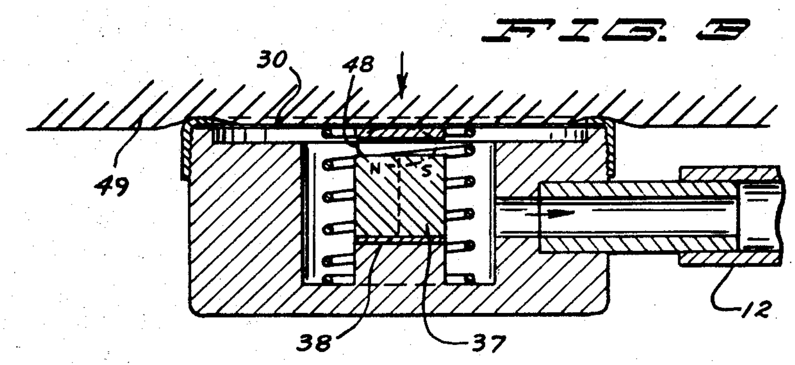
FIG. 3 and 4 are similar to FIG. 2 showing the portions thereof in different positions.

As pressure is applied to the chest piece against a chest wall, a point of maximum audio amplification will be readily noticed by the operator. This point is reached when the chest piece is positioned as shown in FIG. 3, by the application thereto of the operator's hand pressure. This point of maximum audio amplification is at the point where the inward push of the chest wall positions the diaphragm at the point at which the attractive force of the magnet equals the force exerted by the spring and this is the position at which said diaphragm is in a state of equilibrium. It will be understood that the attraction of said magnet increases progressively by the law of the squares as the distance between the magnet and the diaphragm is reduced.

With the chest piece as indicated in FIG. 3 in operation, the diaphragm has a maximum range of movement in flexing or vibrating in corresponding to the movement of the chest wall against which it is placed.

The diaphragm naturally resists flexing and the resistance appears to increase progressively at the extent or distance of flexing increases. Thus in a conventional stethoscope, the diaphragm does not flex freely to correspond with the movement of the chest wall. It tends to have a shorter cyclical movement than that of the chest wall with a result that it tends to dampen the vibration of the chest wall and the transmission of movement from the chest wall through the air column of the stethoscope. The shorter movement results from the resistance of the diaphragm to flexing and its lag in following the retraction of the chest wall. In contrast, the structure herein described provides for the flexing of the diaphragm to correspond fully to the movement of the chest wall with regard both to the expansion and contraction of the chest wall movement.

As the diaphragm is flexed inwardly, the force of the magnet, in increasing geometrically as its distance from the diaphragm is reduced, tends to neutralize the resistance of the diaphragm to flexing whereby the diaphragm flexes freely to correspond with the full movement of the chest wall. The spring 40 is compressed by the expansive movement of the chest wall whereby as the chest wall retracts, said spring causes said diaphragm to return to a position outwardly from a state of equilibrium in which position the diaphragm corresponds closely to the retracted position of the chest wall.

Figure 4:
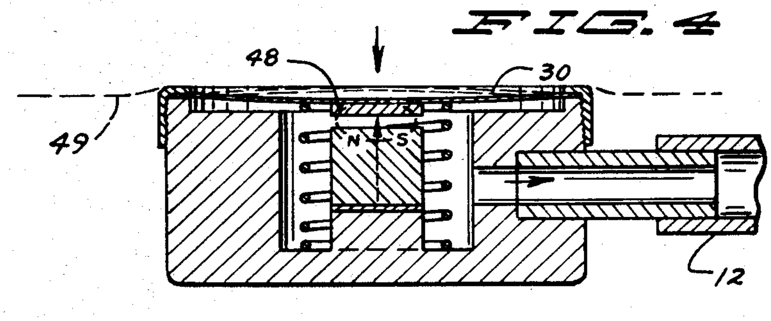

Thus in being coupled with the cooperative action of the spring 40 and the magnet 37, said diaphragm has a cycle of movement about its position of equilibrium which corresponds very closely to the cylical or vibrational movement of the chest wall whereby the full extent of this movement is transmitted through the air column of the stethoscope. The full cycle of movement of the diaphragm is indicated in FIG. 4. It has been found that when the chest piece is applied against the chest wall with a pressure to position the diaphragm in a state of equilibrium, that the audio gain is on the order of double of what can be achieved with a conventional stethoscope.

In a conventional stethoscope, the diaphragm is in a state of equilibrium with air pressure equalized at either side thereof, but in being placed against a chest wall it is pressed inwardly out of a state of equilibrium. Thus the diaphragm is placed in partially flexed position at the beginning of its operation and it rapidly resists further flexing inwardly. As the chest wall retracts, the diaphragm returns only partially to its position of equilibrium. The increased resistance of the diaphragm tends to dampen the effect of the expansion of the chest wall. There results a cyclical or vibrational movement of the diaphragm which does not represent the full range of the movement of the chest wall as is permitted and as results from the use of the invention hereinabove described.

Figure 7:
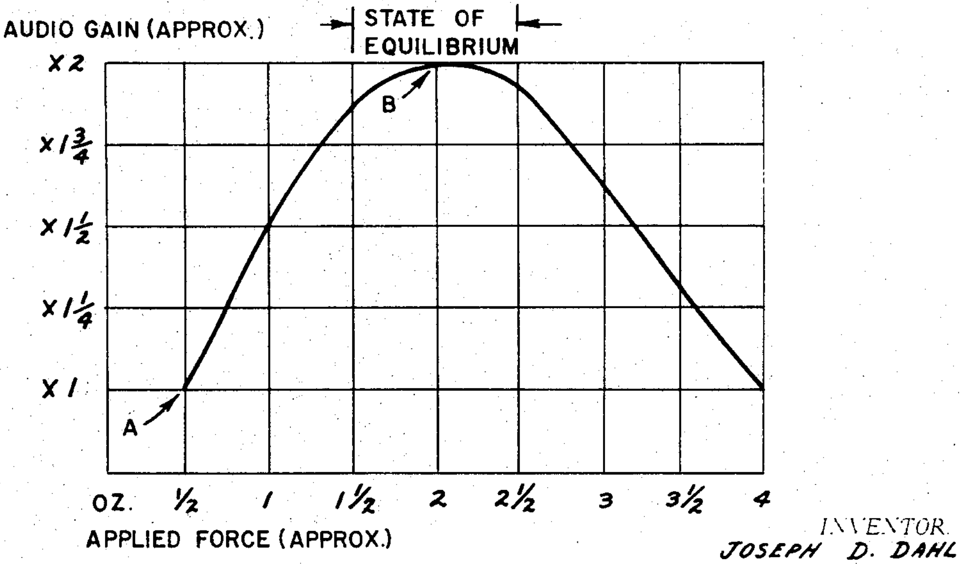
FIG. 7 is a graph showing the relationship between audio gain and applied force.

The audio reception of the body sound through the chest wall as heard with the use of a conventional stethoscope is indicated by the character A in the graph of FIG. 7. Said graph appears to be self-explanatory. The corresponding sound heard by the use of the structure herein is indicated by the character B which indicates an increase on the order of 100% in audio gain.

Modification

Figure 5:
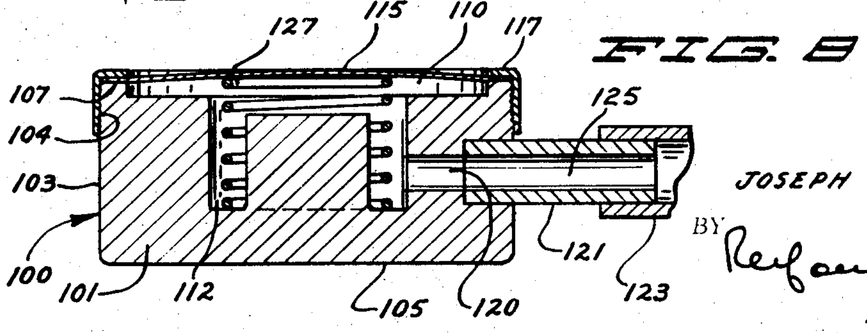
FIG. 5 is a view similar to FIG. 2 showing a modification thereof.
Figure 5:
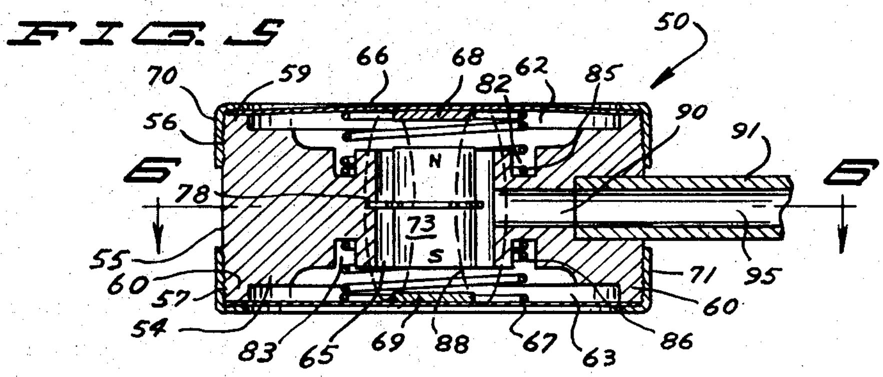
Figure 6:
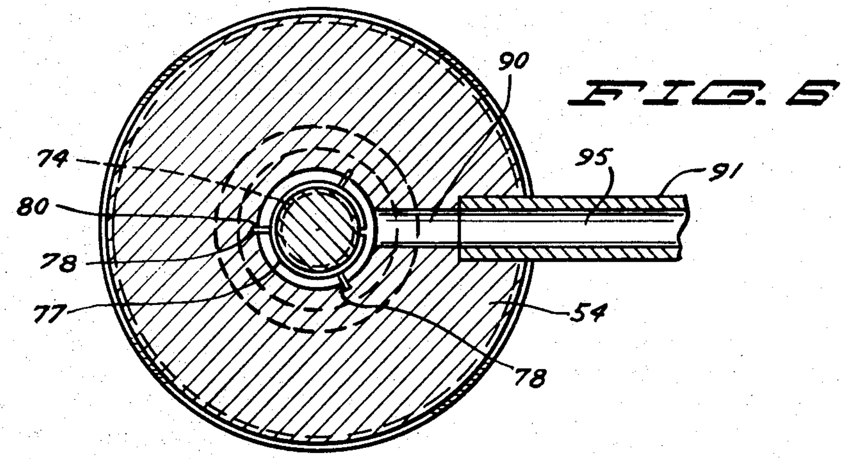
FIG. 6 is a broken view in horizontal section taken on line 6—6 of FIG. 5.

A modification of the chest piece 14 above described is shown in FIGS. 5 and 6 and is indicated generally by the reference numeral 50. Said chest piece will have in connection therewith an air tube such as said air tube 14 and not here shown.

Said chest piece 50 comprises a cylindrical housing 54 which is preferably formed of a magnetic material and which has a side wall 55 having upper and lower threaded edge portions 56 and 57. End walls at either end of said housing are formed as annular rim portions 59 and 60 having small width, and respectively bounded by said rim portions are relatively shallow chambers 62 and 63. Extending between said chambers is a central cylindrical chamber 65.

Respectively overlying said chambers 62 and 63 and being seated on said rim portions 59 and 60 are diaphragms 66 and 67 similar to said diaphragm 30 and respectively having suitably secured to the facing sides thereof plate or disc-like magnetic members 68 and 69. Securing means 70 and 71 on the order of bezels threaded onto the end portions of said housing hold said diaphragm in position.

Disposed centrally axially within said chamber 65 is a magnet 73 having its poles at its respective ends, the north pole at one end and south pole at the other. Said poles are indicated by the characters N and S.

Said magnetic disc members 68 and 69 will be respectively attractive to their respective adjacent poles of said magnet. Said magnet is suitably secured in suspended position within said chamber 65 by a spider-like holding member comprising a resilient ring 77 adapted to be seated within an annular groove 74 about said magnet and having radial legs 78 adapted to be received within accommodating spaced holes 80 formed within the wall of said chamber 65.

Respectively encircling said chamber 65 at either end thereof and extending inwardly of said housing are vertically recessed grooves 82 and 83. Respectively seated within said grooves are coiled compression springs 85 and 86 in opposed relation to one another, extending outwardly thereof to bear against their respective adjacent diaphragms.

The respective poles of said magnet exert an attractive force with respect to their adjacent diaphragms. The spring 86 is particularly adapted to exert just sufficient force against the diaphragm 67 to counter-balance the magnetic force exerted thereon whereby said diaphragm is normally in a state of equilibrium when in inoperative position.

The spring 85 is particularly adapted to exert such force against the diaphragm 66 as to offset the attractive force exerted by the adjacent pole of said magnet 73 and to urge said diaphragm outwardly of a state of equilibrium in like manner as in the case of the diaphragm 30 first above described.

With said housing 54 being formed of a magnetic material, flux paths will be generated between the poles of said magnet 73 as indicated by the reference numeral 88.

Extending radially of said chamber 65 through said housing 54 to the outer side thereof is an outlet 90 having an outer enlarged portion into which is press fit an outlet connecting member 91 to which may be frictionally connected an ear tube. A passage 95 will extend through said outlet 90 and outlet member 91 continuing through an attached ear tube to form an air column.

Operation

The diaphragm 66 operates in like manner as the diaphragm 30 above described. The flux path with respect to the magnet 73 runs from one end of the magnet, through the plate members 68 and 69 and the portion of the housing therebetween, thence to the other end or pole of the magnet.

As the diaphragm 66 is pressed inwardly of the housing by the action of the chest wall against which it is placed, the flux path is shortened and thus becomes more dense, as is known in the art, and in so doing, the magnetic attraction of the S pole of the magnet for the plate member 66 increases to overcome the pressure of the spring 86 and thus pulls the diaphragm 67 inwardly. Thus the diaphragm 67 is caused to have movement corresponding to that of the diaphragm 66 whereby the diaphragms 66 and 67 cooperate to act on the order of a bellows in transmitting the vibratory action of the chest wall through the air column of the stethoscope.

The audio gain in hearing the body sounds represents a substantial increase over what is heard by the use of a conventional stethoscope. From tests which have been made, it is believed that the audio gain thus achieved is on the order of 100%.

Modification

Another modification of the chest piece of the invention herein is shown in FIG. 8 wherein said modification is indicated generally by the reference numeral 100.

Said chest piece 100 comprises a housing 101 indicated as being cylindrical in form having a side wall 103, a bottom wall 105 and an upper annular wall 107 forming a rim. Said side wall has an upper threaded portion 104.

Peripherally defined by said upper annular wall 107 is a relatively shallow chamber 110 recessed into the upper portion of said housing. Extending downwardly from said chamber is a relatively deep annular recess 112.

Overlying said chamber 110 is a diaphragm 115 on the order of the diaphragm 30 having its rim portion overlying said upper wall 107 and being secured by an angled locking ring member 117 commonly referred to as a bezel.

Extending radially of said annular recess 112 is an outlet 120 having an enlarged outer portion into which is press fitted an outlet fitting 121 to which will be attached an ear tube 123 on the order of the ear tube 12. A passageway 125 will extend from communication with said chamber 110 and its recess 112 through said outlet 120, outlet fitting 121 and the ear tube 123 to form the air column of the stethoscope.

Seated in said annular recess 112 is a coiled compression spring 127 having its upper end portion bearing against said diaphragm 115. But for the presence of said spring, said diaphragm would be in a state of equilibrium having equalized air pressure at either side thereof. The spring is particularly arranged and constructed to exert sufficient force against said diaphragm to normally maintain it flexed in a position outward of its position or state of equilibrium on the order of the effect of the spring 40 as described in connection with the diaphragm 30.

Operation

When the chest piece 100 is placed against a chest wall, for maximum reception of the body sounds, just sufficient pressure will be exerted to urge the diaphragm into a position of equilibrium with the pressure against the chest wall offsetting the opposing pressure of the spring. This position is readily detected by a noticeable increase or differential in audio gain.

From its position of equilibrium, the diaphragm is moved to either side thereof, responsive to the outward movement of the chest wall and to the urging of the spring in following the contractive movement of the chest wall substantially its full extent by being urged to its extended position flexed outwardly of its position of equilibrium. Thus substantially the full movement of the chest wall is transmitted to the air column of the device. In a conventional stethoscope, the diaphragm is moved or flexed inwardly of the housing of the chest piece by the expansion or outward movement of the chest wall but returns only to its position of equilibrium and thus does not follow the contraction of the chest wall to transmit the full cyclical or vibrational movement of the chest wall. Hence there is not as complete a transmission of chest wall movement to the air column of a conventional stethoscope as is achieved with the structure comprising the modification above described. It will be understood that in speaking of movement of the chest wall, reference is had to vibrational movement in which the linear distance involved is a very small distance.

Thus it is seen that I have provided a simply constructed manually operable stethoscope which provides substantial improvement in receiving and transmitting body sounds.

What is claimed is:

1. A stethoscope structure having in combination,
a housing,
a chamber within said housing having one side thereof open to the atmosphere,
magnetic means disposed within said chamber,
a flexible diaphragm seated onto said housing overlying said open side of said chamber, said diaphragm being magnetically attractive,
resilient means carried by said housing bearing against said diaphragm restraining the tendency of said diaphragm to yield to the attraction of said magnetic means,
a passage running from said chamber to the atmosphere, and
tubular hearing means running from said passage comprising an air column.

2. The structure set forth in claim 1, wherein said diaphragm includes a magnetically attractive portion.

3. The structure set forth in claim 1, wherein said resilient means comprises a compression spring seated in said chamber and bearing against said diaphragm.

4. The structure set forth in claim 1, wherein
said magnetic means comprises a magnet polarized at one end thereof and seated within said chamber,
said housing is non-magnetic, and
said magnet generates a flux path between the poles thereof.

5. The structure set forth in claim 1, wherein said resilient means exerts a somewhat greater force than the force of said magnetic means with respect to said diaphragm whereby said diaphragm normally is flexed outwardly of a state of equilibrium with respect to said housing.

6. The structure set forth in claim 1, wherein means secure said diaphragm about its periphery to said housing.

7. The structure set forth in claim 1, wherein
said chamber comprises a passage extending through said housing,
said magnetic means comprises a magnet which has its ends polarized with respect to one another and which extends axially of said chamber,
the other end of said chamber is open to the atmosphere,
a diaphragm carried by said housing overlies the other end of said chamber, said diaphragm is magnetically attractive to the adjacent end of said magnet,
resilient means carried by said housing bears against said second mentioned diaphragm, said resilient means and said magnet respectively exert such force with respect to said second diaphragm to position said diaphragm in a state of equilibrium,
said housing is magnetically conductive, the respective poles of said magnet generate flux paths therebetween whereby when said first diaphragm is urged inwardly of said housing in the direction of said magnet, the density of said flux paths increases to overcome the force of said second resilient means to attract and move said second diaphragm inwardly of said housing to correspond to the inward movement of said first mentioned diaphragm.

References Cited

UNITED STATES PATENTS 581,929 5/1897 Wigmore ------------ 181—24

STEPHEN J. TOMSKY, Primary Examiner